United States Patent Office 3,456,736
Patented July 22, 1969

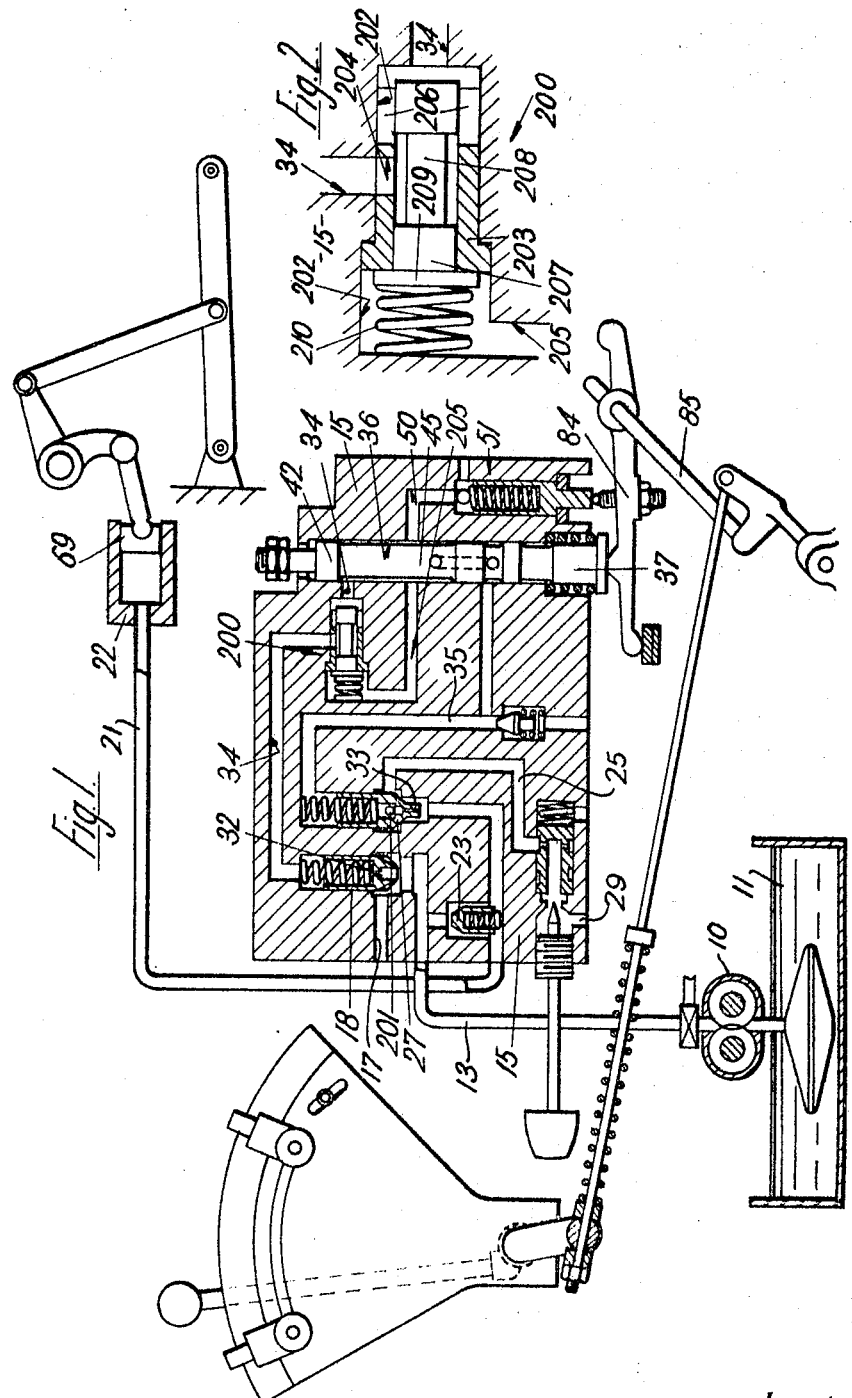

3,456,736
TRACTOR HYDRAULIC POWER LIFT MECHANISM
Charles Hartley Hull and Harry Horsfall, Huddersfield, England, assignors to David Brown Tractors (Canada) Limited, Toronto, Ontario, Canada
Filed Nov. 29, 1965, Ser. No. 510,273
Claims priority, application Great Britain, Dec. 5, 1964, 49,598/64
Int. Cl. A01b 63/112
U.S. Cl. 172—9                                    22 Claims

ABSTRACT OF THE DISCLOSURE

A tractor hydraulic power lift mechanism having a pump supplying fluid under pressure either via a first valve to a hydraulic actuator, which lifts or lowers an implement, or to a sump via a second valve which has a bleed hole allowing fluid to flow through said valve to the sump via a flow control valve and a spool valve which controls the opening and closing of the valve, the flow control valve improving the closing action of the second valve against the pressure of fluid supplied by the pump.

---

The invention relates to a tractor hydraulic power lift mechanism.

Our United States Letters Patent No. 3,315,751, issued Apr. 25, 1967 discloses a hydraulic power lift mechanism, for an agricultural tractor or the like, comprising a pump drawing oil from a sump and delivering it to a hydraulic actuator via a nonreturn valve, a first valve controlling the escape of oil from the upstream side of the nonreturn valve to the sump, a second valve controlling the escape of oil from the downstream side of the nonreturn valve to the sump, the first and second valves being hydraulically balanced and the rear of each of said valves being connected to manually operable valve means capable of unbalancing the first valve only or both the first and second valves. We have found, however, that when the manually operable valve means approach but have not reached a position in which they prevent the escape of oil from the rear of the first valve, the increase in pressure at the rear of said valve is not sufficient to enable said valve to move positively in the closing direction against the resultant increase in pressure upstream of said valve. The object of the present invention is to overcome this disadvantage.

According to the invention, a hydraulic power lift mechanism, for an agricultural tractor or the like, comprises a pump drawing oil from a sump and delivering it to a hydraulic actuator via nonreturn valve, a first valve controlling the escape of oil from the upstream side of the nonreturn valve to the sump, a second valve controlling the escape of oil from the downstream side of the nonreturn valve to the sump, the first and second valve being hydraulically balanced and the rear of each of said valves being connected to manually operable valve means capable of unbalancing the first valve only or both the first and second valves, and a flow control valve in the connection between the first valve and the manually operable valve means.

In the accompanying drawings, which are by way of example only:

FIGURE 1 is a relatively diagrammatic view mainly in section showing the invention incorporated in mechanism arranged to effect weight transfer to a tractor from an implement hitched thereto; and FIG. 2 is a semidiagrammatic sectional view of a detail, on a larger scale.

The preferred embodiment of our invention is substantially identical in construction to the hydraulic power lift mechanism described and illustrated in said Patent No. 3,315,751, with the following exceptions:

(1) An additional flow control valve, indicated generally at 200 in the accompanying drawings, is provided.
(2) A nonreturn valve comprising a ball 201 is provided within the valve 27.
(3) The valve 18 consists of a simple valve.

Referring now to the drawings, wherein FIGURE 1 corresponds to FIGURE 4 of said Patent No. 3,315,751 and uses the same reference characters for clarity of disclosure of the present invention but is modified to illustrate the present invention, and more particularly to FIG. 2 thereof, the additional flow control valve 200 comprises a bore 202 in the valve block 15 and a sleeve 203 secured in said bore. One part of the conduit 34 connects the rear of the valve 18 to a radial port 204 in the sleeve 203, and another part of said conduit connects one end of the bore 202 to the bore 36. An additional conduit 205 connects the other end of the bore 202 to a part of the bore 36 containing the reduced diameter portion 45 of the slide valve 37, so that the conduit 205 always communicates freely with the annular space surrounding said portion and with the passage 50. That end of the sleeve 203 adjacent said one end of the bore 202 is provided with diametrically opposed slots 206. A valve spool 207 having a central portion 208 of reduced diameter is slidable within the sleeve 203, and that end of the spool 207 adjacent said other end of the bore 202 is provided with a flange 209. The spool 207 is urged in a direction away from said other end of the bore 202 by a spring 210 into the position shown in the drawings in which the flange 209 contacts the sleeve 203 and oil can flow from said one part of the conduit 34 to said other part thereof by way of the ports 204, the annular space surrounding the portion 208 of reduced diameter, and the diametrically opposed slots 206.

As disclosed in said Patent No. 3,315,751 the balance lever 84 is slidable axially on the shaft 85, to align said lever either with the slide valve 37 and the relief valve 51, as shown in FIG. 1, or with the slide valve 37 and a height control plunger (not shown), or with the slide valve 37, the height control plunger and a draft control plunger (not shown). The expression "height control" used herein has the same meaning as the less explicit but more commonly used expression "positional control," which was used in said Patent No. 3,315,751.

The mechanism as a whole is substantially identical in operation to the hydraulic power lift mechanism disclosed in said Patent No. 3,315,751, with the following refinements:

When the slide valve 37 is being moved (either automatically, by movement of the draft or height control plunger, or manually) in a downward direction as seen in FIG. 1, it reaches a position in which the land 42 partially blanks off the conduit 34 to an extent where there is a sufficient pressure difference between said other part of said conduit and the bore 36 to move the spool 207 to the left as seen in the drawings, against the action of the spring 210. Communication between the annular space surrounding the portion 208 of reduced diameter and the diametrically opposed slots 206 is therefore restricted, with the result that the pressure in said one part of the conduit 34 and thus at the rear of the valve 18 becomes substantially greater than that in said other part of said conduit. Said valve accordingly moves in the closing direction, as a result of which the pressure on its upstream side increases. Consequently the flow of oil through the bleed hole 32 and through the valves 200 and 37 increases, whereupon the pressure difference between said other part of the conduit 34 and the bore 36 increases, causing the spool 207 to move further to the left and further increasing the pressure at the rear of the valve 18. Thus as the slide valve 37 is moved downwardly, the valve 18 is moved positively in the closing direction despite the increase in pressure upstream of said valve.

The invention therefore comprises a tractor hydraulic power lift mechanism comprising a pump 10 connected to a sump 11 and connected by a first conduit 13 to a first valve 18, a hydraulic actuator 22 connected by a second conduit 21 to a second valve 27, a nonreturn valve 23 interconnecting the first and second conduits, an outlet 17 to the sump controlled by the first valve, an outlet 25, 29 to the sump controlled by the second valve, means 200 interposed in a third conduit 34 connecting the rear of the first valve to manually operable valve means 36, 37 for increasing the pressure of the fluid downstream of the first valve, a bleed hole 32 connecting the first and third conduits, a fourth conduit 35 connecting the rear of the second valve to the manually operable valve means, a bleed hole 33 connecting the second and fourth conduits, and an outlet 50 to the sump from the manually operable valve means.

The nonreturn valve 201 is provided so that when the hydraulic power lift mechanism is controlled solely manually, and the relief valve 51 maintains a predetermined pressure in the hydraulic actuator 22, 69 to transfer a controlled amount of weight to the tractor from an implement hitched thereto, oil cannot flow from the rear of the valve 27 to the hydraulic actuator.

We claim:

1. A tractor hydraulic power lift mechanism comprising a pump and connected by a first conduit to a first valve; a hydraulic actuator connected by a second conduit to a second valve; a nonreturn valve interconnecting the first and second conduits; an outlet to the sump controlled by the first valve; an outlet to the sump controlled by the second valve; means interposed in a third conduit connecting the rear of the first valve to manually operable valve means for increasing the pressure of the fluid downstream of the first valve; a bleed hole connecting the first and third conduits; a fourth conduit connecting the rear of the second valve to the manually operable valve means; a bleed hole connecting the second and fourth conduits; an outlet to the sump from the manually operable valve means; a manually movable actuator for the manually operable valve means; means for automatically operating said actuator in response to variations in the height relative to the tractor of an implement hitched thereto; means for automatically operating said actuator in response to variations in the draft force exerted by the tractor on the implement; fixed abutment for the manually movable actuator; a variable pressure relief valve interposed in the outlet to the sump from the manually operable valve means; means for shifting the manually movable actuator between a position in which it is engageable with both the draft and high responsive means and the manually operable valve means, a position in which it is engageable with the height responsive means and the manually operable valve means, and a position in which it is engageable with said relief valve, a fixed abutment and the manually operable valve means; a conduit connecting the upstream side of the variable pressure relief valve to one end of the flow control valve; and a nonreturn valve interposed in the bleed hole connecting the second and fourth conduits.

2. A tractor hydraulic power lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve, a bleed hole connecting the first and third conduits, a fourth conduit connecting the rear of the second valve to the manually operable valve means, a bleed hole connecting the second and fourth conduits, and an outlet to the sump from the manually operable valve means.

3. A tractor hydraulic power lift mechanism according to claim 2, wherein the means interposed in the third conduit connecting the rear of the first valve to manually operable valve means for increasing the pressure of the fluid downstream of the first valve comprises a flow control valve having a spool movable in a closing direction by increased fluid pressure in the third conduit.

4. A tractor hydraulic power lift mechanism according to claim 2, comprising also a manually movable actuator for the manually operable valve means, means for automatically operating said actuator in response to variations in the height relative to the tractor of an implement hitched thereto, and means for shifting said actuator between a position in which it is engageable with the height responsive means and the manually operable valve means and a position in which it is engageable solely with the manually operable valve means.

5. A tractor hydraulic power lift mechanism according to claim 2, comprising also a manually movable actuator for the manually operable valve means, means for automatically operating said actuator in response to variations in the draft force exerted by the tractor on an implement hitched thereto, and means for shifting said actuator between a position in which it is engageable with the draft responsive means and the manually operable valve means and a position in which it is engageable solely with the manually operable valve means.

6. A tractor hydraulic power lift mechanism according to claim 2, comprising also a manually movable actuator for the manually operable valve means, means for automatically operating said actuator in response to variations in the height relative to the tractor of an implement hitched thereto, means for automatically operating said actuator in response to variations in the draft force exerted by the tractor on the implement, and means for shifting said actuator between a position in which it is engageable with the draft responsive means and the manually operable valve means, a position in which it is engageable with the height responsive means and the manually operable valve means, and a position in which it is engageable solely with the manually operable valve means.

7. A tractor hydraulic power lift mechanism according to claim 2, comprising also a manually movable actuator for the manually operable valve means, means for automatically operating said actuator in response to variations in the height relative to the tractor of an implement hitched thereto, means for automatically operating said actuator in response to variations in the draft force exerted by the tractor on the implement, and means for shifting said actuator between a position in which it is engageable with both the draft and height responsive means and the manually operable valve means, a position in which it is engageable with the height responsive means and the manually operable valve means, and a position in which it is engageable solely with the manually operable valve means.

8. A tractor hydraulic power lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve comprising a flow control valve having a spool movable in a closing direction by increased fluid pressure in the third conduit, a bleed hole connecting the first and third conduits, a fourth conduit connecting the rear of the second valve to the manualy operable valve means, a bleed hole connecting the second and fourth conduits, an outlet to the sump from the manually operable valve means, a variable pressure relief valve interposed in the outlet to the sump from the manually operable valve means, and a manually movable actuator for the manually operable valve means and said relief valve.

9. A tractor hydraulic power lift mechanism according to claim 8, comprising also a conduit connecting the upstream side of the variable pressure relief valve to one end of the flow control valve.

10. A tractor hydraulic power lift mechanism according to claim 8, comprising also a nonreturn valve interposed in the bleed hole connecting the second and fourth conduits.

11. A tractor hydraulic power lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve comprising a flow control valve having a spool movable in a closing direction by increased fluid pressure in the third conduit, a bleed hole connecting the first and third conduits, a fourth conduit connecting the rear of the second valve to the manually operable valve means, a bleed hole connecting the second and fourth conduits, an outlet to the sump from the manually operable valve means, a manually movable actuator for the manually operable valve means, means for automatically operating said actuator in response to variations in the height relative to the tractor of an implement hitched thereto, a fixed abutment for the manually movable actuator, a variable pressure relief valve interposed in the outlet to the sump from the manually operable valve means, and means for shifting the manually movable actuator between a position in which it is engageable with the height responsive means and the manually operable valve means and a position in which it is engageable with said relief valve, the fixed abutment and the manually operable valve means.

12. A tractor hydraulic power lift mechanism according to claim 11, comprising also a conduit connecting the upstream side of the variable pressure relief valve to one end of the flow control valve.

13. A tractor hydraulic power lift mechanism according to claim 11, comprising also a nonreturn valve interposed in the bleed hole connecting the second and fourth conduits.

14. A tractor hydraulic power lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve comprising a flow control valve having a spool movable in a closing direction by increased fluid pressure in the third conduit, a bleed hole connecting the first and third conduits, a fourth conduit connecting the rear of the second valve to the manually operable valve means, a bleed hole connecting the second and fourth conduits, an outlet to the sump from the manually operable valve means, a manually movable actuator for the manually operable valve means, means for automatically operating said actuator in response to variations in the draft force exerted by the tractor on an implement hitched thereto, a fixed abutment for the manually movable actuator, a variable pressure relief valve interposed in the outlet to the sump from the manually operable valve means, and means for shifting the manually movable actuator between a position in which it it is engageable with the draft responsive means and the manually operable valve means and a position in which it is engageable with said relief valve, the fixed abutment and the manually operable valve means.

15. A tractor hydraulic power lift mechanism according to claim 14, comprising also a conduit connecting the upstream side of the variable pressure relief valve to on end of the flow control valve.

16. A tractor hydraulic power lift mechanism according to claim 14, comprising also a nonreturn valve interposed in the bleed hole connecting the second and fourth conduits.

17. A tractor hydraulic powe lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve comprising a flow control valve having a spool movable in a closing direction by increased fluid pressure in the third conduit, a bleed hole connecting the first and third conduits, a fourth conduit connecting the rear of the second valve to the manually operable valve means, a bleed hole connecting the second and fourth conduits, an outlet to the sump from the manually operable valve means, a manually movable actuator for the manually operable valve means, means for automatically operating said actuator in response to variations in the height relative to the tractor of an implement hitched thereto, means for automatically operating said actuator in response to variations in the draft force exerted by the tractor on the implement, a fixed abutment for the manually movable actuator, a variable pressure relief valve interposed in the outlet to the sump from the manually operable valve means, and means for shifting the manually movable actuator between a position in which it is engageable with the draft responsive means and the manually operable valve means, a position in which it is engageable with the height responsive means and the manually operable valve means, and a position in which it is engageable with said relief valve, a fixed abutment and the manually operable valve means.

18. A tractor hydraulic power lift mechanism according to claim 17, comprising also a conduit connecting the upstream side of the variable pressure relief valve to one end of the flow control valve.

19. A tractor hydraulic power lift mechanism according to claim 17, comprising also a nonreturn valve interposed in the bleed hole connecting the second and fourth conduits.

20. A tractor hydraulic power lift mechanism comprising a pump connected to a sump and connected by a first conduit to a first valve, a hydraulic actuator connected by a second conduit to a second valve, a nonreturn valve interconnecting the first and second conduits, an outlet to the sump controlled by the first valve, an outlet to the sump controlled by the second valve, means interposed in a third conduit connecting the rear of the first valve to manually operable valve means for increasing the pressure of the fluid downstream of the first valve comprising a flow control valve having a spool movable in a closing direction by increased fluid pressure in the third conduit, a bleed hole connecting the first and third conduits, a fourth conduit connecting the rear of the second valve to the manually operable valve means, a bleed hole connecting the second and fourth conduits, an outlet to the sump from the manually operable valve means, a manually movable actuator for the manually operable valve means, means for automatically operating said actuator in response to variations in the height relative to the tractor of an implement hitched thereto, means for automatically operating said actuator in response to variations in the draft force exerted by the tractor on the implement, a fixed abutment for the manually movable actuator, a variable pressure relief valve interposed in the outlet to the sump from the manually operable valve means, and means for shifting the manually movable actuator between a position in which it is engageable with both the draft and high responsive means and the manually operable valve means, a position in which it is engageable with the height responsive means and the manually operable valve means, and a position in which it is engageable with said relief valve, a fixed abutment and the manually operable valve means.

21. A tractor hydraulic power lift mechanism according to claim 20, comprising also a conduit connecting the upstream side of the variable pressure relief valve to one end of the flow control valve.

22. A tractor hydraulic power lift mechanism according to claim 20, comprising also a nonreturn valve interposed in the bleed hole connecting the second and fourth conduits.

References Cited

UNITED STATES PATENTS 3,315,751   4/1967   Hull et al. _____ 172—9

ABRAHAM G. STONE, Primary Examiner

A. E. KOPECKI, Assistant Examiner